(12) United States Patent
Sengespeick

(10) Patent No.: US 11,505,713 B2
(45) Date of Patent: Nov. 22, 2022

(54) COMPOSITE MATERIAL AND USE THEREOF

(71) Applicant: Fraunhofer Gesellschaft zur Förderung der angewandten Forschung e.V., Munich (DE)

(72) Inventor: Andreas Sengespeick, Oberhausen (DE)

(73) Assignee: Fraunhofer Gesellschaft Zur Forderung Der Angewandten Forschung E.v.

( * ) Notice: Subject to any disclaimer, the term of this patent is extended or adjusted under 35 U.S.C. 154(b) by 29 days.

(21) Appl. No.: 16/648,356

(22) PCT Filed: Aug. 20, 2018

(86) PCT No.: PCT/EP2018/072435
§ 371 (c)(1),
(2) Date: Mar. 18, 2020

(87) PCT Pub. No.: WO2019/057417
PCT Pub. Date: Mar. 28, 2019

(65) Prior Publication Data
US 2020/0216705 A1 Jul. 9, 2020

(30) Foreign Application Priority Data
Sep. 19, 2017 (DE) .......................... 102017121698.7

(51) Int. Cl.
*C09D 123/08* (2006.01)
*C09D 5/00* (2006.01)
(Continued)

(52) U.S. Cl.
CPC ......... *C09D 123/0869* (2013.01); *C09D 5/00* (2013.01); *C09D 7/61* (2018.01); *C09D 129/14* (2013.01); *C09D 133/062* (2013.01)

(58) Field of Classification Search
CPC ... C08K 3/34; C08K 7/24; C08K 9/08; C08K 9/12; C08F 220/06; C08F 222/385; C09D 133/02; C09D 133/26; C09D 123/0869; C09D 129/14; C09D 133/062; C09D 5/00; C09D 5/082; C09D 7/40; C09D 7/61; C09D 7/66
See application file for complete search history.

(56) References Cited

U.S. PATENT DOCUMENTS

| 4,836,940 A | * | 6/1989 | Alexander | ............... | C09K 8/50 175/72 |
| 2009/0078153 A1 | * | 3/2009 | Shchukin | ............... | B82Y 30/00 106/14.44 |

FOREIGN PATENT DOCUMENTS

| CN | 103172785 B | * | 3/2016 |
| JP | H01292071 A | | 11/1989 |

(Continued)

*Primary Examiner* — Shuangyi Abu Ali
(74) *Attorney, Agent, or Firm* — Edward E. Sowers; Brannon Sowers & Cracraft PC

(57) ABSTRACT

The present invention relates to a composite material, in particular a switchable functional material, comprising (a) a porous carrier material and a swellable material, a method for its preparation and its use in coatings. The composite material is suitable for the production of water-repellent and water-vapor diffusion-open coatings, as well as the use of the composite material.

16 Claims, 4 Drawing Sheets

(51) Int. Cl.
*C09D 133/06* (2006.01)
*C09D 129/14* (2006.01)
*C09D 7/61* (2018.01)

(56) References Cited

FOREIGN PATENT DOCUMENTS

KR       101674923 B1   11/2016
WO         9923140 A1    5/1999

\* cited by examiner

COMPOSITE MATERIAL AND USE THEREOF

CROSS-REFERENCES TO RELATED APPLICATIONS

This application is a National Stage filing of International Application PCT/EP 2018/072435, filed Aug. 20, 2018, entitled Composite Material and Use Thereof, claiming priority to DE 10 2017 121 698.7, filed Sep. 19, 2017. The subject application claims priority to PCT/EP 2018/072435 and to DE 10 2017 121 698.7 and incorporates all by reference herein, in their entirety.

BACKGROUND OF THE INVENTION

The present invention relates to the technical field of switchable composite materials, in particular the use of switchable composite materials in coating compositions for the production of functional coatings.

In particular, the present invention relates to a composite material which is suitable for the production of water-repellent and water-vapor diffusion-open coatings, as well as the use of the composite material.

Furthermore, the present invention relates to a process for the production of a composite material.

Functional coatings are characterized by the fact that they usually have additional positive properties, also called functions, compared to conventional coatings. Thus, functional facade coatings are not only intended to protect building facades from the weather, but also often show improved water-vapor diffusion rates or enable improved thermal insulation.

Commonly used facade coatings are based on paints and can be divided into three groups, namely mineral paints, plastic dispersion paints and silicone resin emulsion paints.

The aforementioned coating systems are still the most commonly used facade paints in practice. Provided the right choice is made, they can be used to coat almost any facade.

It should be noted, however, that within the three groups mentioned above, further fine distinctions must be made. While mineral paints usually contain a silicate or lime binder, there are types of synthetic dispersion paints, for example, which are optimized for good water-vapor diffusion properties; other types, often elastic, crack-bridging systems, however, have a higher diffusion resistance.

In the case of silicone resin emulsion paints, the different types differ greatly in the proportion of the more expensive silicone resin binder; there is no standardization that specifies a minimum silicone content. For the formulation of silicone resin emulsion paints, three types of silicones or starting materials are relevant, which differ in particular in the degree of condensation or polymerisation. The value of the silicones increases with the use of low-molecular silanes over siloxanes to polysiloxanes or silicone resins. Only high-quality silicone resins in a balanced combination with a polymer dispersion result in a genuine silicone resin paint. This paint displays good water-vapor permeability values as well as high permeability for carbon dioxide, good weather resistance and very good water-repellent properties.

However, the production of silicone resin emulsion paints is very costly and the water-vapor permeability of silicone resin emulsion paints can be further improved, especially to enable rapid dehumidification of facades.

Although mineral paints have a very high water-vapor permeability, they are not water-repellent, but highly capillary active and therefore absorb liquid water, which they release into the masonry. For this reason, mineral paints are generally only suitable for outdoor applications if large quantities of water-repellent agents are used. Here it is necessary to achieve complete capillary hydrophobicity, which is usually only partially achieved.

Polymer dispersion paints, in contrast, are often highly crack-bridging, so that mechanical stresses and strains, such as settling cracks, of a substrate, in particular on building facades, can be compensated. However, they are usually water-repellent and only slightly permeable to water-vapor. For this reason, there is always a risk of the facade becoming damp when polymer emulsion paints are used, which favors the formation of mold and algae on the facade.

It is therefore continuously attempted to introduce new or improved functionalities into a facade coating by means of special fillers in novel dye formulations.

Functional fillers for facade coatings are used for example for the following applications:

The patent application WO 2011/132132 A1, corresponding to DE 20 2010 005 960 A1, describes a functional plaster with hollow microspheres, vermiculite or foam glass as a functional filler for improved sound insulation. In particular, a multi-layer structure of the coating or plaster is recommended in order to achieve optimum sound absorption.

EP 1 775 272 A2, corresponding to DE 10 2005 048 538 B3, describes a plaster for interior use which completely dispenses with organic binder components, with a vermiculite content of up to 20 wt. %. The advantage of this coating is seen in the low water-vapor diffusion resistance $\mu$, which should be 100 times smaller than that of standard dispersion paints for interior use. At the same time, a certain amount of room humidity is stored in the coating and released again when the room air is dry. The regulation of the room humidity in combination with the rapid absorption and release of moisture through the functional coating permanently prevents any mold growth. Comparable products containing fillers based on perlite, tuff or expanded clay are used as capillary-active restoration plasters and are also used as fire protection plasters.

WO 2013/117511 A1 is representative for the efforts to develop superhydrophobic surface coatings. For this, work is being carried out not only on the use of hydrophobic agents based on silanes and silanols, but above all on a suitable surface structuring. In particular, calcium carbonate particles with a pronounced hedgehog structure are described, which allows wetting angles of 140° C. with water to be achieved.

CN 103 351 817 A describes a self-regulating energy-storing paint for interior and exterior use. The advantages of this color are a favorable thermal insulation, low water absorption, fire protection and resistance to ageing. Calcium oxide is listed as the active component in 8 to 16 parts by weight.

In addition, swellable materials are also used in the construction sector. Swellable sealing materials are mainly used in the construction sector as swellable tapes for pipe transits, horizontal water barriers and as gunning mixes. For this purpose, swellable materials such as superabsorbents and bentonites, chemically modified polyurethane elastomers and butyl rubber are used. Swelling rubber based on modified polyurethanes represents a relatively new class of materials. Here, swelling is carried out by means of water-swellable polymer resins based on polychlorophene, which are inseparably bonded to the polychlorophene matrix by vulcanization. A "washing out" of the swelling resins during the swelling process is therefore not possible.

Furthermore, CN 103 172 785 B "Superabsorbent self-crosslinking epoxy acrylate copolymer and its preparation and application" describes a copolymer as a coating material which is characterized by high water absorption. The coating is based on the copolymer and with the aid of porous fillers, it achieves high water absorption and water-vapor permeability and can be used for the regulation of humidity in interior areas. However, the coating is not suitable for sealing as an exterior coating.

In particular in the case of facade coatings, the influence on the moisture regulation of the underlying masonry or building is highly relevant.

Two physical parameters determine the influence of a facade coating on the moisture management of a building: On the one hand, the water absorption coefficient, the so-called W-value, which describes the water absorption of a coating, and on the other hand the water-vapor diffusion resistance, the so-called μ-value, which expresses the resistance to water-vapor in a building component. The smaller the water absorption, the better the protection against moisture and rain. Heated buildings have, especially in winter, a temperature gradient from the inside to the outside. Warm air can absorb more air humidity, which diffuses outwards in the direction of the temperature gradient and is held in place by a facade coating, which partly acts as a vapor barrier. This can lead to a humidification of the facade and subsequently to different damage to the facade, such as the formation of algae and fungi or the flaking of the facade coating.

In the state of the art it is therefore constantly being tried to develop facade coatings which, while providing protection from the outside against moisture penetration, also allow the facade to dry.

In the development of coatings for facade paints, attempts are currently being made to develop dispersion paints in which the use of polysiloxanes and silanols creates capillary hydrophobicity in order to increase the otherwise low water-vapor diffusion values. However, as the proportion of polysiloxanes increases, the facade surface becomes more susceptible to soiling and greying.

For building protection, however, facade paints that enable balanced wall moisture management are of decisive importance. Silicate dispersion paints have the advantage of a high water-vapor diffusion rate, but also the disadvantage of high capillary water absorption. Polymer emulsion paints lack sufficient water-vapor permeability. Silicone resin emulsion paints achieve better water-vapor diffusion values, but the achieved values still need to be improved and the production of silicone paints is associated with high costs.

Therefore, the state of the art still lacks a system which allows the production of water-repellent and water-vapor diffusion-open coatings.

In particular, there is a lack of systems which can be processed like conventional paints, but which have increased water-repellent properties and high water-vapor permeability compared to these.

Neither coating systems nor additives are known from the state of the art, which can be used under the most diverse application conditions and still deliver consistently good results.

In particular, no fillers are known from the state of the art which would make it possible to modify known coating systems in such a way that the water-vapor diffusion permeability of the coating is increased while at the same time the water-repellent properties of the coating are maintained or even improved.

In addition, no coating systems are known to date which are easy to produce and exhibit improved water-vapor diffusion rates and water-repellent properties compared to the state of the art.

It is therefore a task of the present invention to provide a material which avoids or at least mitigates the aforementioned disadvantages associated with the state of the art.

BRIEF SUMMARY OF THE INVENTION

In particular, one task of the present invention is to provide a material which improves the water-vapor permeability of coatings, in particular facade coatings, while at the same time the water absorption capacity of the coating is not increased to the expected extent, i.e. it is not increased in comparison to known systems, but the water-repellent properties are even improved if possible.

In addition, a further task of the present invention is to provide a material which can be incorporated into a large number of coatings and which increases the water-vapor permeability of the coating while at the same time counteracting the absorption of liquid water.

According to a first aspect of the present invention, the aforementioned task is solved by a composite material described herein; further advantageous embodiments of this aspect of the present invention are similarly described.

Further subject matter of the present invention according to a second aspect of the present invention is the use of a composite material as described herein.

Again, a further subject matter of the present invention according to a third aspect of the present invention is a process for the production of a composite material; further advantageous embodiments of this aspect of the present invention are also provided.

It goes without saying that the particular features mentioned in the following, in particular special embodiments or the like, which are only described in relation to one aspect of the invention, also apply in relation to the other aspects of the invention, without this requiring any express mention.

Furthermore, for all relative or percentage, in particular weight-related, quantities or amounts stated below, it is to be noted that, within the framework of this invention, these are to be selected by the person skilled in the art in such a way that the sum of the ingredients, additives or auxiliary substances or the like always results in 100 percent or 100 percent by weight. This, however, goes without saying for the person skilled in the art.

In addition, the skilled person may deviate from the values, ranges or quantities listed below, depending on the application and individual case, without leaving the scope of this invention.

In addition, all of the parameters specified below or the like can be determined by standardized or explicitly specified determination methods or by common determination methods known per se by the person skilled in the art.

With this provision made, the subject-matter of the present invention is explained in more detail in the following.

DETAILED DESCRIPTION OF THE INVENTION

Figure 1:
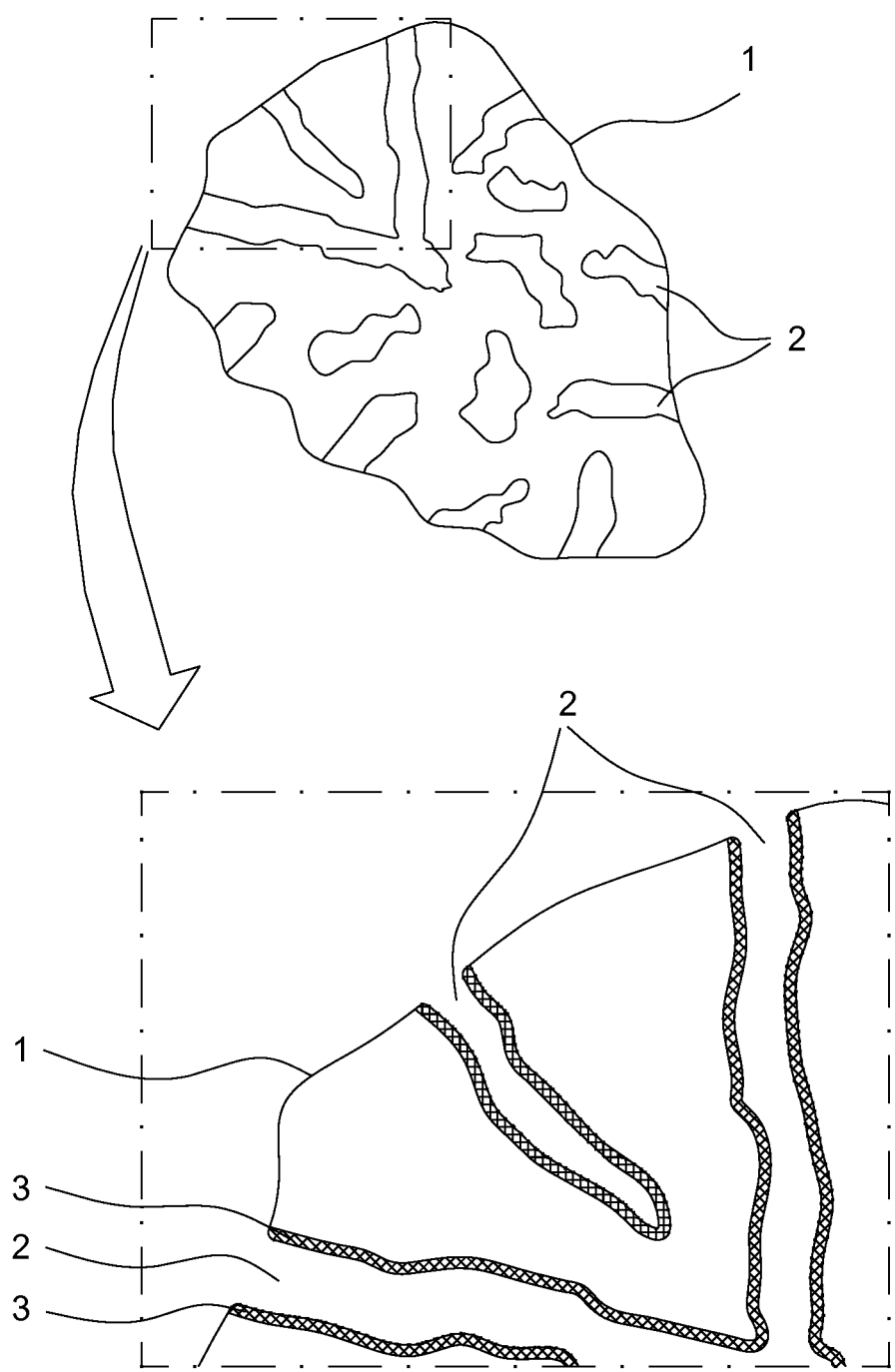
FIG. 1 provides a schematic structure of a composite particle according to the invention with swellable material in the non-swollen state.

Subject matter of the present invention—according to a first aspect of the present invention—is thus a composite material, in particular a switchable functional material, preferably composite particles, comprising
(a) a porous carrier material, in particular porous particles, and
(b) a swellable material,
wherein the pores of the porous carrier material contain the swellable material.

It is a special feature of the composite material or composite particles according to the invention that this or these preferably have a high water-vapor permeability. At the same time, the swellable material swells on contact with liquid water and closes the pores of the composite material so that no further liquid water can penetrate via the composite material. In this way it is ensured that on contact with liquids, in particular with water, the liquid does not reach deeper layers by capillary action of the porous composite material, but after initial water absorption by the composite material and in particular by the swellable material, the pores of the porous carrier material, which is preferably in the form of porous particles, are closed by the swelling swellable material and thus the entry of further liquid, in particular further water, is prevented.

In particular, the composite material according to the invention thus enables the production of coatings, in particular facade coatings, which are designed to be switchable with respect to their water permeability. In particular when using so-called superabsorbent polymers (SAPs), such as polyacrylates, the water absorption coefficient (W-value) of the facade coating is minimized by the switchability of the coating containing the composite material according to the invention in the event of water contact, for example through driving rain.

Through the use of highly porous carrier materials, in particular highly porous fillers or particles, pore systems can be produced in a coating, in particular in a facade coating, when the composite material according to the invention is incorporated into coatings, so that the coatings have a water-vapor diffusion-equivalent air layer thickness (Sd value) of less than 0.1 m and are therefore considered to be highly diffusible.

By functionalizing the porous carrier material with a swellable material, in particular a swellable polymer, the pores are swelling when in contact with liquid, in particular water, and thus a targeted and reversible sealing is achieved, whereas the composite material is otherwise highly permeable to water-vapor.

Coating compositions, in particular paints, which contain the composite material according to the invention, are therefore particularly suitable for exterior use and minimize the capillary water absorption of a facade. By swelling the swellable material and closing the pores, water is prevented from penetrating through the pores and the capillaries of the facade coating into deeper layers and causing the building materials to become damp.

By using the composite material according to the invention as highly porous, switchable functional materials, in particular fillers, two contradictory building physics requirements, namely a highly diffusible facade surface and a water-repellent effect, can be combined.

Facade coatings, which feature the composite material according to the invention, have, as already mentioned, a switchability against liquid water, in particular against driving rain, and a minimized capillary water absorption while maintaining a high water-vapor diffusion rate. In particular when superabsorbent polymers (SAPs) are used, the capillary water absorption (W value) of a diffusible wall paint can be reduced from initially more than 0.5 kg/m$^2$ h$^{0.5}$ to total values in the range from 0.05 to 0.2 kg/m$^2$ h$^{0.5}$, such a coating thus being considered water-repellent. The coatings usually have a water-vapor diffusion equivalent air layer thickness (Sd value) between 0.01 and 0.1 m and are therefore highly permeable.

In the state of the art, water-vapor diffusion-open and water-repellent coatings are often produced by dispersion paints which are capillary hydrophobicized by the use of polysiloxanes and silanols in order to increase the water-vapor diffusion values which would otherwise be low. However, the coatings obtained in this way are often not as effective as desired, are expensive to produce and have limited use.

Within the scope of the present invention, it is now possible to provide a material which can specifically improve the moisture management of buildings.

Furthermore, the composite materials according to the invention, in particular the composite particles, can be used in a variety of coatings and increase the water-vapor permeability of the coatings while at least retaining the inherent water-repellent properties of the coating. The mechanical properties of the coatings are also not negatively influenced when using the composite material according to the invention.

In particular, the composite particles according to the invention can be used in plastic dispersion paints or silicone resin emulsion paints to improve their water-vapor permeability.

In the context of the present invention, a swellable material is in particular a material which increases its volume by absorption, i.e. absorption of liquid, in particular of liquid water. The change in volume is reversible, the decrease in volume preferably taking place by releasing the previously absorbed liquid, in particular water, in gaseous form, in particular as water-vapor.

According to a preferred embodiment of the present invention, the composite material is present in form of particulate matter, i.e. in the form of composite particles. By using particulate composite materials, in particular composite particles, the composite material according to the invention can be incorporated in an excellent way in a multitude of coatings or coating compositions.

If, within the scope of the present invention, the composite material is present in the form of composite particles, it has proven successful if the composite particles have particle sizes in the range of 0.5 µm to 5 mm, in particular 0.5 µm to 1 mm, preferably 1 to 500 µm, more preferably 1 µm to 200 µm, particularly preferably 2 to 100 µm, more preferably 3 to 80 µm, particularly preferably 5 to 30 µm. With the aforementioned particle sizes, particularly thin-layer coatings can be produced, whereby at the same time a high loading density of the surface of a substrate with the composite particles in a binder matrix can be achieved, resulting in a high water-vapor diffusion rate of the coating.

As already explained above, a porous substrate material, in particular porous particles, is used in the context of the present invention as the base material for the composite material according to the invention. In the context of the present invention, particularly good results are obtained if the porous carrier material has a porosity in the range of 20 to 99%, in particular 25 to 98%, preferably 30 to 98%. The porosity in the context of the present invention is the ratio of the pore volume, also called void volume, of the porous carrier material to the total volume of the porous carrier material. The porosity of the composite particles or of the carrier material according to the invention or of the carrier material in percent can be determined in particular by mercury porosimetry or by calculation according to the BET model or as oil number.

A high porosity of the carrier materials is preferred in order to ensure high water-vapor diffusion rates of the composite material.

In the context of the present invention, particularly good results are obtained if the porous carrier material comprises a predominantly open pore system, i.e. a predominantly open porosity. It is particularly preferred in this context if the porous carrier material has an open pore system, i.e. the pores of the porous carrier material are formed at least predominantly, preferably almost exclusively, from open pores. In this context, open pores are defined as the pores of the porous carrier material which are in direct contact with the environment, whereas closed pores are located inside the carrier material and are completely surrounded by the carrier material so that there is no direct contact with the environment and consequently no exchange of matter with the environment can take place. Under open porosity in particular the portion of the total porosity which is formed by open pores is to be understood.

An open pore system, in particular a high proportion of open pores, of the porous carrier material, is particularly advantageous, as this allows particularly high water-vapor diffusion rates to be achieved.

It is particularly preferred in this context if at least 50%, in particular at least 60%, preferably at least 70%, of the total pore volume of the porous carrier material is formed by open pores.

Likewise, particularly good results are obtained if 50 to 100%, in particular 60 to 99%, preferably 70 to 98%, of the total pore volume of the porous carrier material is formed by open pores.

As far as the pore size of the pores of the porous carrier material is concerned, this can naturally vary over a wide range. However, it has been proven to be effective if the porous carrier material has pores with pore sizes in the range of 10 nm to 2 µm, in particular 15 nm to 1.5 µm, preferably 20 nm to 1.3 µm, more preferably 25 nm to 1 µm. Pore sizes in the above-mentioned range permit, on the one hand, good water-vapor permeability and high water-vapor diffusion rates and are not already blocked by the inclusion of the swellable material. On the other hand, they are narrow enough for the swellable material to close the pores when liquid water is absorbed. Within the scope of the present invention, the determination of the pore size can be carried out by methods which are common to the skilled person, in particular, for example, by mercury porosimetry or according to the BET model.

According to a preferred embodiment of the present invention, the porous carrier material has a pore volume of 0.4 to 1.0 ml/g, in particular 0.5 to 0.9 ml/g, preferably 0.6 to 0.8 ml/g.

According to a preferred embodiment of the present invention, the porous carrier material is a filler, in particular a mineral filler, or a mixture of fillers. If the carrier material is a highly porous filler, in particular a highly porous filler, or a mixture of fillers, the composite material according to the invention, or in particular the composite particles according to the invention, can be added as fillers to conventional coating systems. In particular, the composite particles according to the invention can replace portions of conventional fillers in coating compositions, so that the use of the composite particles according to the invention increases the water-vapor diffusion rate, but the water-repellent properties of the coatings are either improved or at least maintained, while the mechanical properties of the coatings usually remain unchanged.

If a mineral filler is used as a porous carrier material in the context of the present invention, the mineral filler is usually selected from silicas, in particular fumed silicas, xerogels, in particular silica gels, diatomaceous earth, zeolites, aerogels, perlite, tuff, expanded clay, vermiculite and other layered silicates, such as bentonite or kaolinite, respectively, and mixtures thereof.

Particularly good results are obtained in this context if the mineral filler is selected from silicas, in particular fumed silicas, silica gels, diatomaceous earth and mixtures thereof, preferably fumed silicas, silica gels and mixtures thereof.

As far as the loading of the porous carrier material with the swellable material is concerned, this can vary in a wide range depending on the respective requirements. However, the degree of loading of the porous carrier material with the swellable material is preferably adjusted in such a way that the swellable material in swollen states does not swell out of the pores of the carrier material and thus, for example, negatively influences the mechanical properties of the coating. Particularly good results are obtained within the scope of the present invention if the porous carrier material has a degree of loading with the swellable material in the range of 0.05 to 0.5, in particular 0.08 to 0.4, preferably 0.10 to 0.30. The degree of loading is defined in particular as the quotient of the mass of the swellable material in the un-swollen state to the mass of the porous carrier material, in particular the filler.

If a superabsorbent polymer (SAP) is used as the swellable material, which is formed in the presence of the porous carrier material and in particular in its pores, it has proven successful if the degree of loading of the carrier material with the monomer solution for producing the swellable material is varied in the range from 0.2 to 3, in particular 0.4 to 2.5, preferably 0.5 to 2. With the above-mentioned weight-related ratios of monomer solutions to porous carrier material, it is generally possible, on the one hand, to achieve a sufficiently high loading of the porous carrier material with the polymer to enable the pores to be closed, while, on the other hand, the loading is sufficiently low to achieve a high water-vapor permeability.

The loading of the porous carrier material with swellable material or the formation of the swellable material in the pores of the carrier material is preferably carried out in at least partially swollen state. In this way it is ensured that not too large a quantity of swellable material is stored in the pores of the porous carrier material or that the pores of the carrier material are already blocked in the non-swollen state.

As mentioned above, the present invention usually provides that the swellable material swells by absorbing a liquid, in particular liquid water.

As far as the increase in volume of the swellable material due to the absorption of liquid, in particular water, is concerned, this increase in volume can also vary within wide ranges. However, it has proven successful if the volume of the swellable material increases during the swelling process, relative to the volume of the non-swollen swellable material, by at least a factor of 0.5, in particular by at least a factor of 1, preferably by at least a factor of 2, more preferably by at least a factor of 3.

It has also proven to be advantageous if the volume of the swellable material increases during the swelling process, relative to the volume of the non-swollen swellable material, by a factor of 0.5 to 10, in particular 1 to 8, preferably 2 to 7, more preferably 3 to 6.

The starting value for the non-swollen swellable material is the volume of the swellable material in the non-swollen state under standard conditions according to DIN ISO 291: 2008-08, i.e. at 23° C., an air humidity of 65% and an air pressure between 0.86 bar and 1.06 bar.

Particularly good results are obtained within the scope of the present invention if the swellable material has a degree of swelling of 1 to 10, in particular 1 to 8, preferably 1.5 to 7, more preferably 2 to 6. In the context of the present invention, the degree of swelling of the swellable material is understood to be the quotient of the mass of the swollen polymer, in particular of the absorbed water, to the mass of the non-swollen swellable material.

As far as the selection of the swellable material is concerned, all suitable materials can be selected, whereby suitable materials are known to the expert. In particular, it is possible that the swellable material is selected from natural polymers, synthetic polymers, mineral substances and their mixtures. Good results are obtained in this context if the swellable material is selected from natural and synthetic polymers and mixtures thereof, preferably synthetic polymers. Particularly good results are obtained in the context of the present invention when superabsorbent polymers (SAPs), so-called superabsorbents, are used.

If a natural polymer is used as a swellable material in the context of the present invention, it has proven effective if the natural polymer is selected from alginates, alginic acid, amylose, amylopectin, agar, gelatin, callose, carrageenan, cellulose, chitin, chitosan, dextran, guluronic acid, inulin, laminarin, lichenin, pullulan, pustulan, starch, starch derivatives, xanthan and mixtures thereof.

If, however, a synthetic polymer is selected in the context of the present invention, it has proven successful if the synthetic polymer is selected from (meth)acrylates, poly(meth)acrylic acid, salts of poly(meth)acrylic acid, polyacrylamide, polyalcohols as well as their co- and terpolymers and mixtures. In particular, synthetic polymers are preferred which are produced in the presence of crosslinkers or which are additionally crosslinked after their production. In this context, diacrylate esters, allyl methacrylates, triallylamines, tetraallyloxyethanes and polyfunctional vinyl monomers can be used as crosslinkers.

As already mentioned above, particularly good results are obtained within the scope of the present invention if the swellable material is a so-called superabsorbent polymer.

Within the scope of the present invention, it is usually intended that the composite particles have a bulk density in the range of 500 to 1,500 g/l, in particular 600 to 1,250 g/l, preferably 750 to 1,100 g/l, more preferably 800 to 1,000 g/l.

Figure 2:
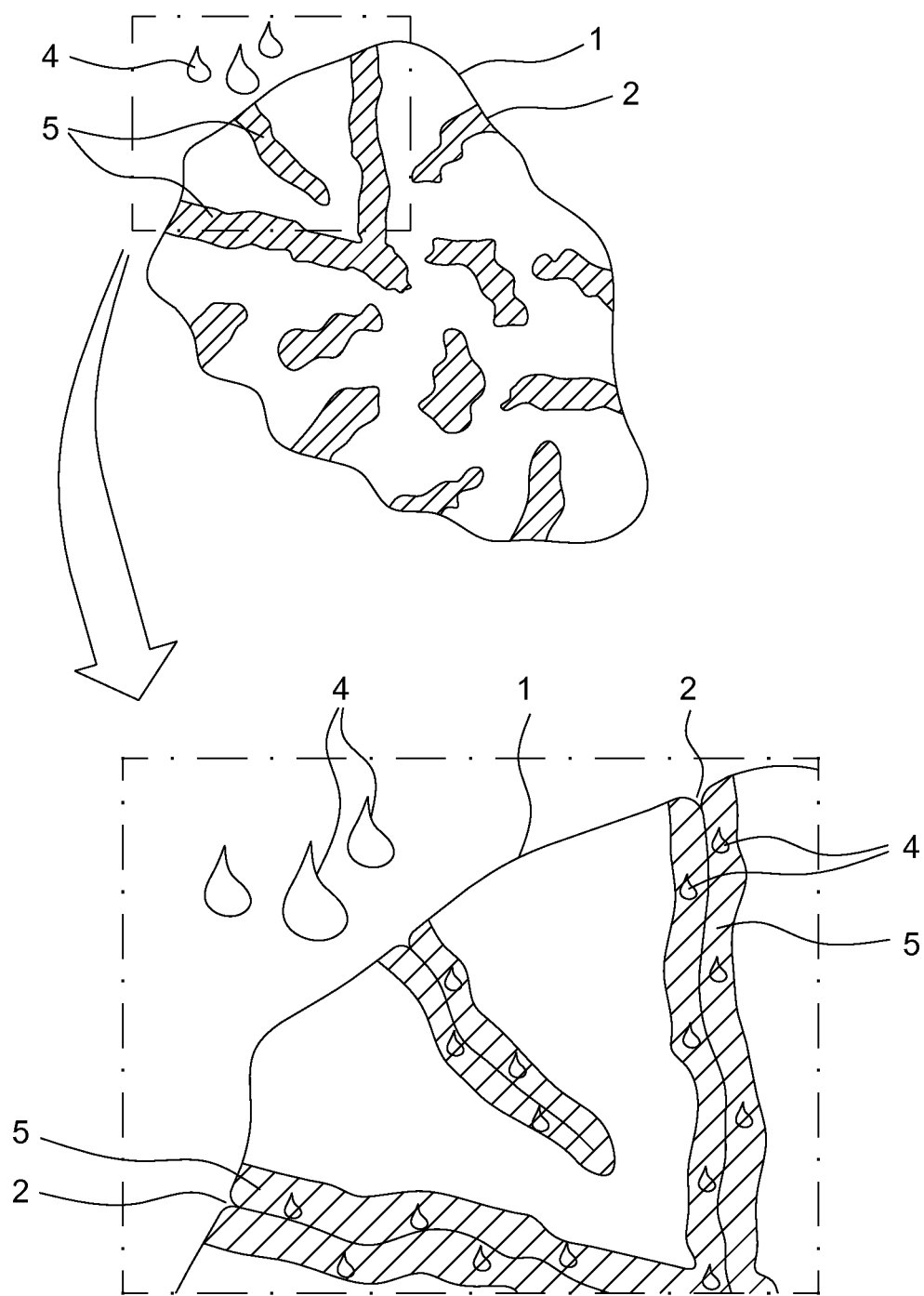
FIG. 2 provides a schematic representation of a composite particle according to the invention with swellable material in the swollen state.
Figure 3:
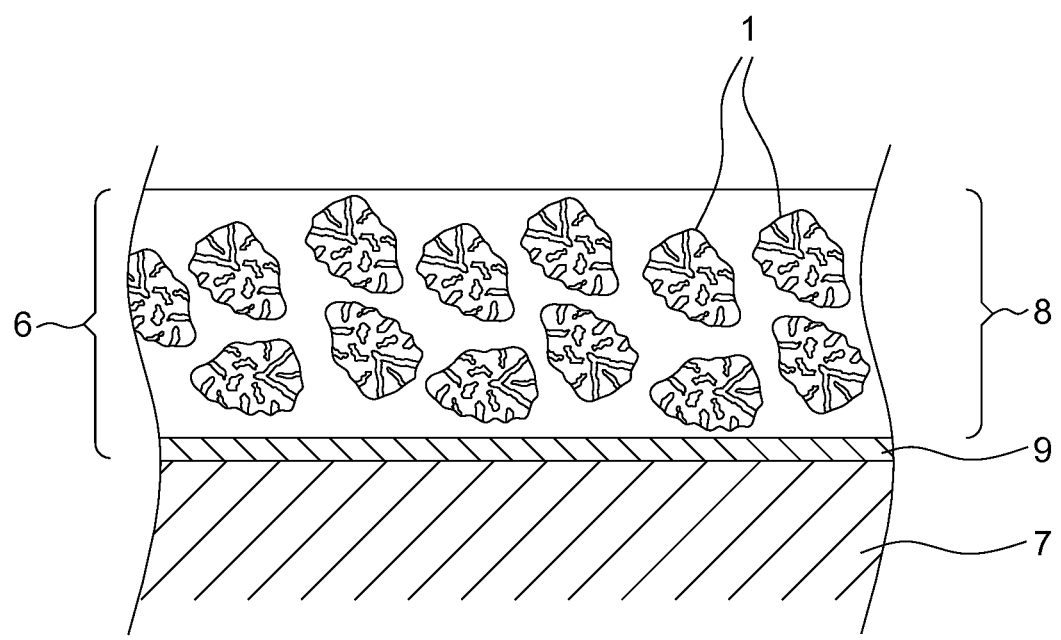
FIG. 3 provides a schematic representation of a coating system functionalized according to the invention.
Figure 4:
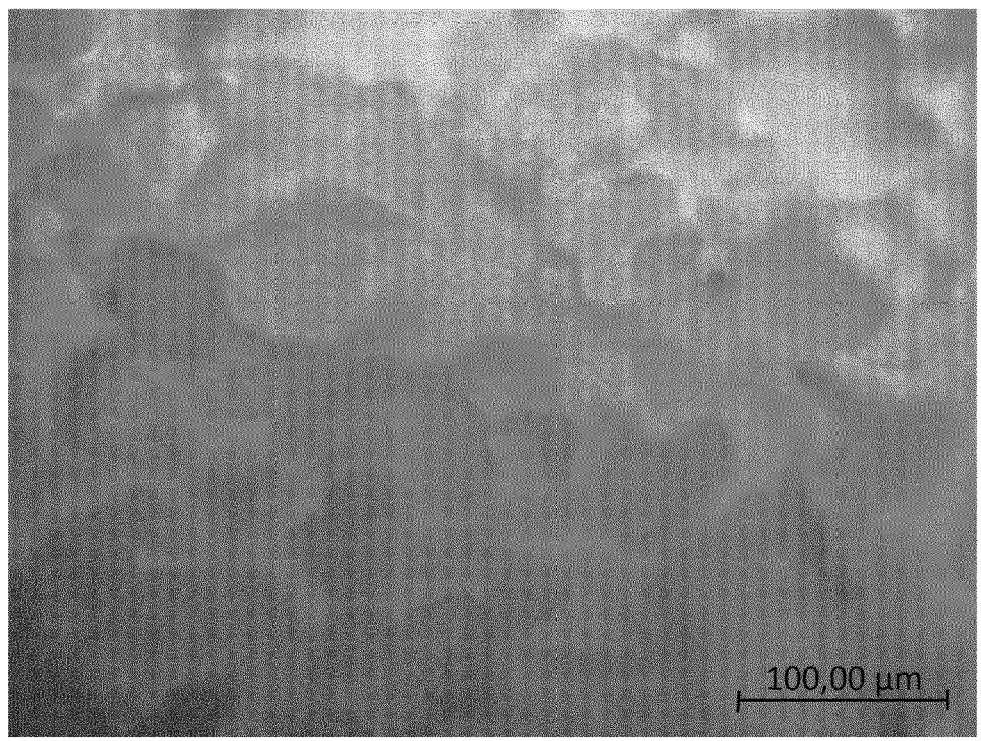
FIG. 4 provides a light microscopic image in 500× magnification of a coating functionalized according to the invention in a dry state.

The following figures show, according to
FIG. 1 a schematic structure of a composite particle according to the invention with swellable material in the non-swollen state;
FIG. 2 a schematic representation of a composite particle according to the invention with swellable material in the swollen state;
FIG. 3 a schematic representation of a coating system functionalized according to the invention;
FIG. 4 a light microscopic image in 500× magnification of a coating functionalized according to the invention in a dry state and
FIG. 5 a light microscopic image in 500× magnification of a coating functionalized according to the invention after treatment with colored water.

Further subject matter of the present invention—according to a second aspect of the present invention—is the use of a composite material, in particular composite particles, as described above in coatings, in particular in facade coatings, corrosion protection coatings, anti-ice coatings and/or in wood protection coatings.

The composite materials described above are excellently suited for incorporation into all coating systems used to regulate the moisture content of a substrate. In addition to the already described water-repellent and water-vapor diffusion-open facade coatings, composite materials are also particularly suitable for incorporation in corrosion protection coatings, since a balanced moisture content in the paint layer prevents the formation of condensation water in the event of temperature differences in the coating and thus protects the corrosion protection coatings from damage.

The composite materials can also be successfully used in anti-ice coatings, as the absorption of surface moisture delays and possibly prevents the formation of ice on the coating.

The composite particles can also be successfully used in wood protection coatings, in particular wood protection varnishes, as a coating modified in this way keeps the moisture content of the wood constant and thus prevents the development of tensions due to shrinkage or swelling of the wood substrate.

The object of the invention is thus also the use of a composite material, in particular composite particles as described above, for regulating the moisture balance of substrates by coating.

For further details on this aspect of the present invention, reference can be made to the above explanations on the composite material according to the invention, which apply accordingly with regard to the use according to the invention.

Further subject matter of the present invention—according to a third aspect of the present invention—is a process for the production of a composite material, in particular composite particles, wherein
(a) in a first process step, a porous support material is provided, and
(b) in a second process step following the first process step (a), a swellable material is introduced into the pores of the porous carrier material and/or formed in the pores of the porous carrier material.

The swellable material can, for example, be brought into contact with the porous carrier material and be introduced into the pores of the porous carrier material in dissolved or finely dispersed form. However, it is also possible to synthesize the swellable material directly in the pores of the porous carrier material. This is particularly useful if the swellable material is a synthetic polymer, such as a superabsorbent polymer.

According to a preferred embodiment of the present invention, in process step (a) the porous carrier material is provided in bulk or as a dispersion. In the context of the present invention, it is preferred when the porous carrier material is provided in bulk, i.e. in the form of a powder bed, and subsequently brought into contact with the swellable material. The use of the porous carrier material, in particular of the porous particles, as a powder bed or as a powder bulk has the advantage that the pore systems of the porous carrier material are freely accessible for the solutions or dispersions containing the swellable material or its precursors.

However, it is also possible that the porous carrier material is provided in the form of a dispersion and then, for example, the reactants are added to the dispersion to produce a swellable material.

In the context of the present invention, it is usually intended that the dispersion contains a liquid dispersing agent. If, in the first process step (a), the porous carrier material is thus presented in the form of a dispersion, the usually solid porous carrier material is provided in a liquid dispersion medium or dispersion medium so that a solid-in-liquid dispersion is obtained. In the context of the present invention, a dispersion is to be understood in particular as a heterogeneous mixture of at least two substances which do not or only scarcely dissolve or chemically combine with each other and thus form a two-phase mixture. Usually one or more substances, the so-called disperse phase or dispersed phase, are finely dispersed in another continuous substance, the so-called dispersion medium or dispersant. The solid-in-liquid dispersions preferably used in the context of the present invention are also referred to as suspensions.

According to a preferred embodiment of the present invention, in process step (b) the swellable material or precursors of the swellable material are added in liquid form to the porous carrier material, in particular as a solution or dispersion.

In this context, it has proven to be particularly useful if the same solvent or dispersion agent is used as in process step (a). A solvent or dispersant preferably used in the context of the present invention is water. The use of water allows the swellable material to be introduced into the pores of the carrier material in a swollen state or to be synthesized there, thus ensuring that, after removal of the solvent or dispersant from the swellable material, the pore system of the porous carrier material is not blocked, but remains permeable to water-vapor in particular.

Particularly good results are obtained within the scope of the present invention if in process step (a) the porous carrier material is provided and liquid solutions or dispersions of a swellable polymer or monomer solution are slowly added in order to ensure that the porous carrier material is loaded as uniformly as possible with the swellable material. If monomer solutions are used, they are subsequently polymerized, for example by subsequent radical polymerization. In particular by using monomer solutions it is possible to coat the inner pores of the porous carrier material as uniformly as possible with the swellable material.

Particularly good results are obtained in this context if the monomer solution used contains 60 to 95 wt. %, preferably 70 to 90 wt. %, of solvents or dispersants, preferably water, based on the monomer solution.

In the context of the present invention, preferably a swellable material in the form of a superabsorbent polymer (SAP) is synthesized in the pores of the porous carrier material. Particularly good results are obtained if—as already mentioned above—acrylate-based superabsorbent polymers are produced. In particular, it has proven successful when superabsorbent polymers based on acrylic acid are synthesized with N,N'-methylenebisacrylamide as crosslinker. If, in the context of the present invention, a monomer solution is used to produce a swellable material in the pores of the porous carrier material, it has proven effective if the solution containing the monomer has a proportion of 1 to 10 mol-%, in particular 2 to 8 mol-%, preferably 3 to 7 mol-%, more preferably 4 to 6 mol-%, of monomers, relative to the total amount of material in the solution.

Furthermore, good results are obtained within the context of the present invention if the monomer solution further contains at least one cross-linking agent. If the monomer solution contains a cross-linking agent, the monomer solution contains the cross-linking agent in particular in amounts of 0.1 to 10 mol-%, preferably 0.5 to 8 mol-%, more preferably 1 to 7 mol-%, particularly preferably 2.5 to 6 mol-%, based on the total amount of material of the monomer solution. The above-mentioned compounds and compound classes are particularly suitable as crosslinkers.

If superabsorbent polymers based on acrylic acid are to be produced, it is preferred to set a degree of neutralization of 0%.

By producing superabsorbent polymers under the above-mentioned conditions, it is possible to cover the pores of the porous carrier material in such a way that the swellable material does not swell out of the porous carrier material. In addition, after adding the monomer solution to the porous carrier material, it is possible that a further solution or dispersion is added which has at least one starter for initiating the polymerization reaction in order to initiate the polymerization.

The use of dispersions or solutions both for the preparation of the swellable material and for incorporation in the pores of the carrier material permits very rapid mixing and uniform distribution of the swellable material or precursors in the pores of the porous carrier material.

Within the scope of the present invention, it may also be provided that, in a third process step (c) following the second process step (b), the carrier material loaded with the swellable material is isolated, if necessary subsequently washed and then dried. The loaded carrier material can be isolated in particular by all the techniques which are known per se to the person skilled in the art, for example by filtration, sieve processes or removal of the solvent or dispersion agent by distillation, wherein filtration and sieve processes are preferred due to the simple execution.

By washing the isolated loaded carrier material undesired reaction residues or unreacted monomer solutions or additives can be removed from the composite materials. The solvent or dispersant used for the reaction is usually used for washing.

If the isolated composite material is dried, it has proven successful if the composite material is dried at temperatures in the range of 20 to 100° C., in particular 30 to 90° C., preferably 40 to 80° C., more preferably 50 to 70° C.

For further details on the process according to the invention, reference can be made to the above explanations on the composite material according to the invention and its use, which apply correspondingly to the process according to the invention for the production of the composite material.

The composite material or the composite particles described above is or are excellently fit for coating compositions for the production of functional coatings, preferably water-repellent diffusion-open coatings.

In particular, a coating composition for producing a functional coating, preferably a water-repellent diffusion-open coating, comprises preferably (A) a composite material, in particular composite particles, as described above, and
(B) a binding agent.

Now, as to the amount in which the coating composition contains the composite material, this can naturally vary within wide ranges. However, it has proven to be useful if the coating composition contains the composite material in quantities of 5 to 60 wt. %, in particular 7 to 50 wt. %, preferably 10 to 40 wt. %, more preferably 15 to 25 wt. %, based on the coating composition.

Similarly, it may be provided that the coating composition contains the binder in quantities of 5 to 50 wt. %, in particular 7 to 40 wt. %, preferably 10 to 30 wt. %, more preferably 15 to 35 wt. %, based on the coating composition.

Particularly good results are obtained when the binder is a polymer or a mixture of polymers. In this context, it has proven effective if the binder is an organic polymer or a mixture of organic polymers.

Further, it is preferred if the polymer is selected from polyurethanes, polystyrenes, polyvinyl acetates, polyvinyl esters and/or polyacrylates as well as their blends and copolymers. It is particularly preferred in this context if the polymer is a polyvinyl acetate-ethylene-acrylate copolymer.

Preferred binder systems have an acidic pH value, such as vinyl acetate-ethylene-acrylate copolymers. In such binders or binder systems, the usually surface-acidic fillers can be easily incorporated without causing the superabsorbents in the composite particles to swell or flocculate. Vinyl acetate-ethylene-acrylate copolymers maintain the switchability of the composite particles and enable a quick sealing of the coating. In addition, binders based on vinyl acetate-ethylene-acrylate copolymers are usually characterized by particularly low levels of volatile organic compounds (VOCs).

Accordingly, it may be provided that the coating composition has a pH value in the range of 3 to 6, especially 4 to 5.

As far as the minimum film forming temperature (MFT) of the polymer used in the coating composition is concerned, this can vary widely depending on the specific requirements. However, it has been proven beneficial if the polymer has a low minimum film forming temperature in the range of −40 to 20° C., preferably −20 to 10° C., more preferably −10 to 0° C. Polymers with the above-mentioned minimum film forming temperatures allow a wide range of application possibilities on the one hand, but on the other hand they also allow the formation of a uniform, closed coating.

In general, the coating composition is in the form of a dispersion, in particular a solid-in-liquid dispersion.

If the coating composition is in the form of a dispersion, it is usually intended that the coating composition contains a dispersant. Particularly good results are obtained if the coating composition contains the dispersant in quantities of 20 to 80 wt. %, in particular 30 to 70 wt. %, preferably 35 to 60 wt. %, more preferably 40 to 50 wt. %, based on the coating composition.

The dispersant can be selected from water or common organic solvents or from mixtures of water and organic solvents, depending on the respective requirements. However, water is preferably used as the dispersion agent, since water is available at low cost and is also harmless from environmental and working life aspects.

It is preferred if the coating composition contains at least one further filler. If the coating composition contains a further filler, it has proven effective if the coating composition contains the further filler in quantities of 0.01 to 50 wt. %, preferably 0.05 to 35 wt. %, more preferably 0.1 to 30 wt. %, particularly preferably 0.1 to 25 wt. %, very particularly preferably 1 to 10 wt. %, based on the coating composition.

Similarly, it has proven effective if the further filler is an inorganic filler, in particular a particulate inorganic filler.

In this context, particularly good results are obtained if the further filler is selected from calcium carbonate, alumina, aluminium hydroxide, magnesium hydroxide, barium sulfate, calcium sulfate, quartz, calcium silicate and mixtures thereof, preferably calcium carbonate. By using further fillers, the use of cost-intensive binders can be minimized and the mechanical properties of the resulting coating can be adjusted.

Furthermore, it may be intended that the coating composition contains at least one pigment. If the coating composition contains a pigment, particularly good results are obtained if the coating composition contains the pigment in quantities of 1 to 30 wt. %, preferably 2 to 25 wt. %, more preferably 3 to 20 wt. %, particularly preferably 5 to 15 wt. %, based on the coating composition. The use of pigments, especially in the above-mentioned quantities, allows the coloration of the resulting coating to be adjusted in a targeted manner. It is a special feature that the coating compositions described above can be used to produce almost any colored coating which is a switchable functional coating with respect to liquid water.

A large number of pigments known to the expert can be used within the scope of the present invention. However, particularly good results are obtained if the pigment is selected from the group of titanium dioxide, zinc oxide, iron oxides, chromium oxides, cadmium sulfide, zinc sulfide and chromates and mixtures thereof, preferably titanium dioxide and zinc oxide and mixtures thereof.

As far as the amount of particles in the coating composition is concerned, this can naturally vary over a wide range. However, it has been proven successful if the coating composition has a total content of particles, in particular in the form of the composite material, further fillers and pigments, of less than 74 vol. %, in particular less than 60 vol. %, based on the volume of the coating composition.

Similarly, it may be provided that the coating composition has a total content of particles, in particular in the form of the composite material, further fillers and pigments, of 10 to 74 vol. %, in particular 20 to 65 vol. %, preferably 25 to 60 vol. %, more preferably 35 to 60 vol. %, based on the coating composition.

The coating composition should not contain more than 74 vol. % of particles or fillers, since with higher proportions of fillers the fillers are quickly dissolved out of the resulting coating; the coating chalks.

However, to achieve low $S_d$ values, it is advantageous to have as high a proportion of composite particles as possible in the coating composition, up to the critical pigment volume concentration of 74 vol. %. With increasing filler concentration above 66 vol. %, however, the capillary water absorption deteriorates dramatically. A volume concentration of the composite particles of 20 and 60 vol. %, especially 35 and 55 vol. %, based on the coating composition, has proven to be advantageous.

Furthermore, it is advantageous if the coating composition contains at least one hydrophobing agent, especially a silanizing agent.

If the coating composition contains a hydrophobing agent, the coating composition usually contains the hydrophobing agent in amounts of 0.01 to 10 wt. %, preferably 0.1 to 7.5 wt. %, preferably 0.5 to 5 wt. %, particularly preferably 1 to 3 wt. %, based on the coating composition.

Preferably, the hydrophobing agent, in particular silanizing agent, is selected from the group of silanes, oligomeric silanes, silanols, siloxanes, siliconates and mixtures thereof, in particular oligomeric silanes, silanols, siloxanes and mixtures thereof. Hydrolysable silanes or their oligomers, i.e. siloxanes, are particularly preferred in this context. Particularly good results are obtained in the context of the present invention if the hydrophobing agent is selected from alkyldimethoxysilanes, dialkyldimethoxysilanes, phenyltriethoxysilanes and diphenyldimethoxysilanes and mixtures and condensation products thereof, in particular methyltrimethoxysilane, octyltriethoxisilane, phenyltriethoxysilane, dimethyldimethoxysilane, diphenyldiethoxysilane and mixtures and oligomers thereof.

With regard to the coating composition, it is usually provided that the coating composition has at least one further component, in particular in the form of an additive and/or a filler.

In this context, the further component is usually selected from the group of rheological additives, preservatives, stabilizers, associative thickeners, acids and/or bases, surfactants, deacidifying components, film formers, waxes, UV absorbers, biogenic active ingredients, pH stabilizers, pH adjusters and dyes. The use of further components, in particular additives and auxiliary substances, allows, on the one hand, the properties of the coating composition, in particular properties of the coating composition which are relevant for processing and storage, as well as the properties of the resulting coatings to be adjusted in a targeted manner.

If the coating composition contains a further component, the coating composition usually contains the further component in quantities of 0.01 to 15 wt. %, in particular 0.05 to 10 wt. %, preferably 0.1 to 8 wt. %, more preferably 0.1 to 5 wt. %, based on the coating composition.

A particularly advantageous coating composition comprises
(A) a composite material in quantities from 5 to 60 wt. %,
(B) a binder in quantities of 5 to 50 wt. %,
(C) a dispersing agent, in particular water, in quantities of 20 to 80 wt. %,
(D) at least one further filler in quantities of 0.01 to 50 wt. %
(E) at least one pigment in quantities of 1 to 30 wt. %,
(F) a hydrophobing agent in quantities of 0.01 to 10 wt. %, and
(G) auxiliary substances and/or additives in quantities of 0.01 to 15 wt. %
in each case based on the coating composition.

All the above parameters and characteristics can be applied accordingly to this preferred coating composition.

Usually the coating composition has a solids content in the range of 30 to 70 wt. %, in particular 35 to 60 wt. %, preferably 40 to 55 wt. %, based on the coating composition.

As far as the viscosity of the coating composition is concerned, this may be varied over a wide range depending on the intended use and the form of application to be employed. In general, however, the coating composition has a Brookfield dynamic viscosity at 20° C. in the range of 100 to 50,000 mPas, in particular 500 to 30,000 mPas, preferably 1,000 to 20,000 mPas, more preferably 2,000 to 15,000 mPas, particularly preferably 3,000 to 10,000 mPas, very particularly preferably 4,000 to 8,000 mPas.

The coating composition can be applied to substrates by any suitable method known to the person skilled in the art. Usually, however, the coating composition is applied by brushing, rolling, scraping and/or spraying onto a substrate, in particular a building facade.

As far as the application of the coating composition is concerned, it has proven to be advantageous if the coating composition is applied with a layer thickness in the range of 20 to 600 µm, in particular 50 to 500 µm, preferably 100 to 350 µm, more preferably 100 to 200 µm, on a substrate, in particular a building facade.

Similarly, it has also proven to be effective if the coating composition is applied in 1 to 10, in particular 1 to 5, preferably 2 to 3, layers on a substrate.

Furthermore, it may be intended that the coating composition is applied to a substrate in an amount of 100 to 500 g/m$^2$, in particular 150 to 400 g/m$^2$, preferably 150 to 350 g/m$^2$, more preferably 150 to 250 g/m$^2$.

With the composite material or coating composition described above, novel and particularly high-performance coatings are accessible.

A particularly advantageous coating, especially for coating building facades, comprises
(A) a composite material as described above; and
(B) a cured binder.

Usually the coating has a thickness in the range of 20 to 500 µm, in particular 50 to 400 µm, preferably 100 to 300 µm, more preferably 150 to 250 µm.

In addition, the coating may be intended to have a surface weight of 90 to 200 g/m$^2$, in particular 100 to 190 g/m$^2$, preferably 110 to 180 g/m$^2$, more preferably 120 to 180 g/m$^2$.

Furthermore, it may be provided within the scope of the present invention that the coating is water-repellent, in particular impermeable to driving rain. However, it can also be provided that the coating is open to diffusion of water-vapor.

It is preferred if the coating is water-repellent, in particular impermeable to driving rain, and diffusion-open to water-vapor. A special feature of the coating described is that it can be both water-repellent and open to diffusion of water-vapor.

It has proven successful if the coating has a capillary water absorption, determined according to DIN EN ISO 1062-3, in the range of 0.001 to 0.5, in particular 0.005 to 0.4, preferably 0.01 to 0.3, more preferably 0.01 to 0.1.

Preferably the coating has an water-vapor diffusion-equivalent air layer thickness, determined according to DIN EN ISO 7783-2, in the range from 0.001 to 0.5, in particular 0.001 to 0.3, preferably 0.005 to 0.2, more preferably 0.01 to 0.1. The coating is thus preferably highly permeable.

Similarly, it may be intended that the coating is crack-bridging. With crack-bridging coatings, both unevenness and tension in the masonry can be compensated without the coating cracking and without reducing its function. A high elasticity of the binder used creates a crack-bridging effect of the facade paint and additionally prevents drying cracks.

Usually the coating is intended to have an elongation at break according to DIN 5350 EN of up to 500%, in particular 400%, preferably 350%. Similarly, it may also be intended that the coating has an elongation at break according to DIN 5350 EN in the range of 70 to 500%, in particular 80 to 400%, preferably 100 to 350%.

With the aforementioned inventive composite material and coating composition, coating systems comprising a coating as described above are accessible for application to a substrate.

It may be advantageous in this context to provide a primer layer between the coating and the substrate.

When a primer is placed between the substrate and the coating, the primer may be intended to contact the coating and/or the substrate directly. In this context, it is particularly preferred if the primer layer directly contacts the coating and the substrate.

It is possible that the primer layer is based on at least one organic polymer and at least one organosilicon compound.

In this context, it may be provided that the polymer is selected from polyacrylates and polyesters and mixtures thereof.

As for the organosilicon compound, this is typically selected from silanes, silanols and siloxanes.

In particular, good results are obtained when the organosilicon compound is selected from the group of alkyltrimethoxysilanes, dialkyldimethoxysilanes, phenyltriethoxysilanes, diphenyldimethoxysilanes and mixtures and oligomers thereof. In particular, it may be provided that the organosilicon compound is selected from the group consisting of methyltrimethoxysilane, octyltriethoxysilane, phenyltriethoxysilane, dimethyldimethoxysilane, diphenyldimethoxysilane and their oligomers.

With the above-mentioned primer coat, the adhesion of the described coating or the described coating composition can be guaranteed even on very unfavourable substrates. In particular, primer layers with the above-mentioned high proportions of organosilicon compounds also ensure a high water-vapor diffusion permeability of the primer layer and consequently of the entire coating system.

Alternatively, however, it may also be provided that up to 10 wt. % of a commercially available deep base or up to 10 wt. % of the aforementioned organosilicon compounds are added to the aforementioned inventive coating composition to form a coating composition which is applied in one layer to the substrate. Subsequently, further layers of the coating composition are applied without a deep base or high amounts of organosilicon compounds. This often allows to dispense with a special primer layer.

As far as the layer thickness of the primer layer is concerned, it has proven successful if the primer layer has a layer thickness in the range of 10 to 100 μm, in particular 20 to 80 μm, preferably 20 to 70 μm, more preferably 20 to 50 μm.

Furthermore, the composite materials according to the invention allow access to a process for the production of a coating system, in particular for coating a building facade, wherein a coating composition is applied to a substrate, in particular a building facade, and is cured or cross-linked so that a coating is obtained.

It is usually provided that the coating composition is applied to the substrate by brushing, rolling, scraping and/or spraying, in particular by brushing, rolling and/or scraping.

As far as the drying time of the coating composition is concerned, it has proven to be best if the coating composition is cured or cross-linked, in particular dried, over a period of 1 to 24 hours, in particular 4 to 20 hours, preferably 6 to 16 hours, more preferably 8 to 12 hours.

It is preferable that a primer layer, in particular in the form of a primer composition, is applied to the substrate before the coating composition is applied.

Particularly good results are obtained in this context if the primer composition is based on a dispersion, in particular an aqueous dispersion.

As already mentioned above in connection with the coating system, particularly good results are obtained if the primer composition comprises at least one organic polymer and at least one organosilicon compound.

Particularly good results are obtained when the organosilicon compound is selected from silanes, silanols and siloxanes, with the use of the above specific silanes or their oligomers being preferred. Particularly good results are obtained when the organosilicon compound is selected from the group of alkoxysilanes and alkoxysiloxanes, in particular methyltrimethoxysilane, octyltriethoxysilane, phe-nyltriethoxysilane, dimethyldimethoxysilane, diphenyldimethoxysilane and their oligomers.

Usually, it is intended that the primer composition comprises the organosilicon compound in amounts of 0.5 to 25 wt. %, in particular 1 to 15 wt. %, preferably 1 to 10 wt. %, based on the base composition. This applies in particular if a special primer composition is used.

However, as mentioned above, it is also possible that the coating composition previously described can be modified by adding 10 to 15 wt. % of a commercially available deep base or by adding a maximum of 10 wt. % of silanes or siloxanes or silanols and be used as the bottom layer of the coating system. The unmodified coating composition is then applied to this layer.

As far as the viscosity of the primer composition is concerned, it has been established that the primer composition has a Brookfield dynamic viscosity at 20° C. in the range of 80 to 2,500 mPas, in particular 85 to 1,500 mPas, preferably 85 to 1,000 mPas, more preferably 90 to 700 mPas, particularly preferably 100 to 500 mPas.

It is usually intended that the primer composition is applied to the substrate by brushing, rolling, scraping and/or spraying.

Similarly, it may be intended that the primer composition is applied to the substrate with a layer thickness in the range of 10 to 150 μm, in particular 20 to 120 μm, preferably 20 to 100 μm, more preferably 20 to 80 μm.

The subject matter of the present invention is further explained below in a non-restrictive manner on the basis of preferred embodiments by the figure descriptions and the working examples.

FIG. 1 shows the schematic structure of a composite material according to the invention in the form of a composite particle 1 with a pore system, which is preferably formed by open pores 2. The carrier material of the composite particle 1 preferably consists of silica gel or silicic acid with particle sizes in the range of 10 to 60 μm.

The walls of the pores 2 of the composite particles 1 are loaded or coated with a swellable material 3, preferably an acrylate-based superabsorbent polymer, wherein the swellable material 3 does not close the pores 2 of the composite material 1 in the non-swollen state as shown in FIG. 1. The composite particle 1 thus exhibits a high water-vapor diffusion rate, i.e. it is highly permeable to gaseous water. The same applies to coatings in which the composite particle is incorporated.

FIG. 2 shows a schematic representation of the composite material according to the invention, in particular a composite particle 1, after contact with liquid water 4. Through contact with liquid water 4, the swellable material 3 shown in FIG. 1 changes in the pores 2 of the composite particle 1 into a swollen state 5 shown in FIG. 5, which closes the pores 2 of the composite material 1 so that no further water can be absorbed through the pores of the composite material 1.

The composite material 1 in accordance with the invention is characterized in particular by the fact that the liquid water 4, which is absorbed in the swollen polymer 5, can be released again in gaseous form, so that the swollen swellable material, in particular the swollen superabsorbent polymer, can return to the non-swollen state 3 as shown in FIG. 1. The composite material 1 according to the invention thus permits the production of switchable functional materials which are highly permeable to water-vapor but whose pores close on contact with liquid water so that the materials are water-repellent. Due to the swelling process, coatings with the composite material according to the invention show a high capillary water absorption at the beginning, in particular within the first half hour of contact with water, which, however, after the pores are closed by the swollen polymer, drops to values far below those of conventional coatings, so that the coatings produced with the composite material according to the invention are water-repellent overall.

Furthermore, FIG. 3 shows a coating system 6 containing the composite material according to the invention, which is applied to a substrate 7. The substrate 7 is preferably a building facade or building wall. The coating system 4 consists of a coating, in particular a functional coating 8, which contains the switchable composite particles 1, and a primer layer 9. The coating 7 contains the composite particles 1 and is therefore highly permeable to water-vapor, but is water-repellent on contact with liquid water.

The binder of the coating 8 is usually a polymeric vinylacetate-ethylene-acrylate binder, which on the one hand is highly water-repellent and on the other hand has excellent elongation at break of up to 330%, so that the coating 8 can also compensate thermally induced changes and tensions of the substrate 7 without being damaged.

The primer layer 9 is usually based on a polymeric binder, in particular an acrylate binder, which contains up to 10 wt. % of hydrolysable silanes, siloxanes or silanols. The use of silanes, siloxanes and silanols on the one hand improves the adhesion of both the primer layer 9 and the coating 8 applied thereto to the substrate 7 and on the other hand ensures a high water-vapor permeability of the primer layer 9. In this way, moisture can always be released from the substrate, in particular masonry, into the environment, effectively preventing the formation of mold.

FIG. 4 shows a light microscopic image of a coating with the composite particles according to the invention in non-swollen condition in 500× magnification. The coating shown has a volume fraction of composite particles of 55%. The composite particles were produced by reacting silica gel with acrylic acid and methylenebisacrylamide. In FIG. 4 the individual composite particles in the coating are clearly visible.

Figure 5:
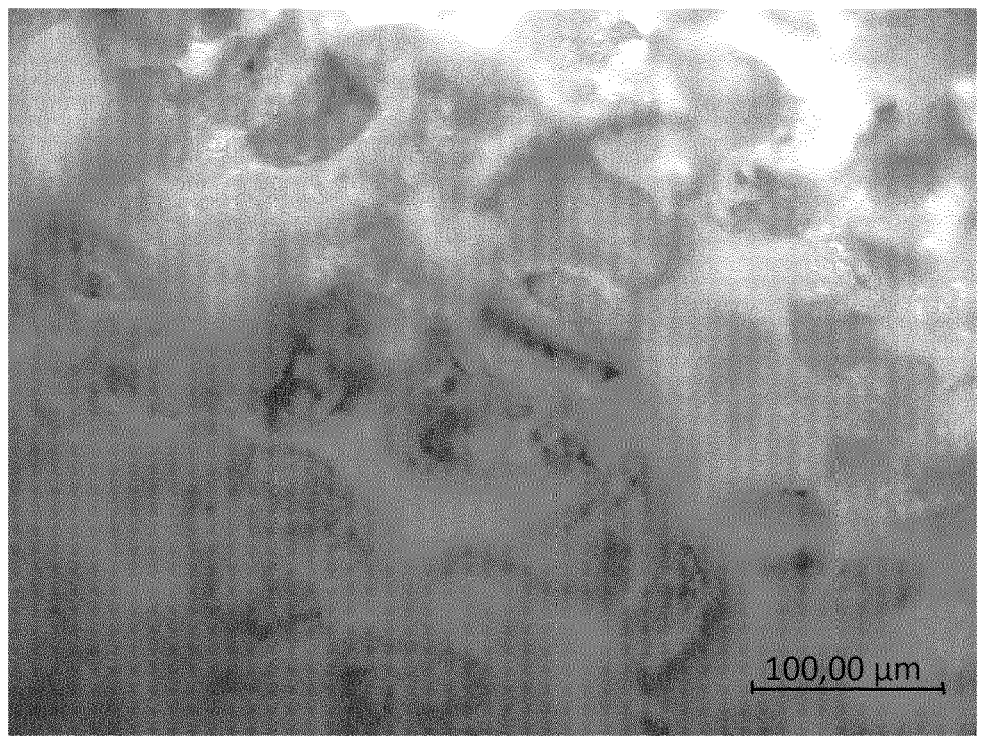
FIG. 5 provides a light microscopic image in 500× magnification of a coating functionalized according to the invention after treatment with colored water.

FIG. 5 shows the same coating as FIG. 4 in the form of a light microscope image magnified 500 times, after the coating has been treated with colored water, in particular after it has been brought into contact with it. Any excess water not absorbed by the coating was removed before the photo was taken. It can be seen very clearly in FIG. 5 that the water has been absorbed into the composite particles, which can be recognized by the dark staining of the composite particles. Due to the absorption of the liquid water, the superabsorbent polymer swells in the pores of the porous carrier material, so that no further liquid water can be absorbed by the capillary activity of the fillers. The coating thus becomes water-repellent.

Working Examples

1. Production of Functionalized Composite Particles

In the following, the production of composite particles according to the invention is described using a silica gel carrier material and a super-absorbent polymer on an acrylate basis.

Two solutions, a monomer solution and a starter solution, are prepared with the following compositions:

Monomer Solution
64 g acrylic acid (monomer)
8.4 g N,N'-methylenebisacrylamide (crosslinker)
325.6 g water 400 g of the monomer solution with a monomer content of 4.8 mol %, a crosslinker content of 6.1 mol % and a degree of neutralization of 0% are prepared.

Starter Solution
0.32 g ammonium peroxodisulfate
0.32 g sodium metabisulfite
5 ml water Subsequently, 516 g of silica gel with a particle size of 0.040 to 0.063 mm are provided. The starter solution and monomer solution are divided into smaller portions and mixed together before addition to the filler in order to prevent premature polymerization of the monomer solution.

The combined solutions are added to the solid material over a period of 60 min with a peristaltic pump at U=10 rpm and a dosage of approx. 5 ml/min. The monomer solution is added while stirring, leaving a free-flowing product.

Stirring is carried out at less than 100 rpm with an anchor stirrer.

The silica gel is at the limit of loading, which means that the product is no longer dusty and has a floury but moist consistency. The reaction vessel is then rinsed with nitrogen and the polymerization is then carried out in a water bath at 60° C. under stirring for 1 hour.

Due to insufficient mixing, agglomerates may form in the peripheral areas during polymerization, but these can be dissolved relatively easily. The product obtained is dried overnight in a drying oven at 60° C. A slight agglomeration is possible, but can be easily broken up.

2. Preparation of a Coating Composition

Table 1 below shows the composition of a preferred coating composition.

TABLE 1

Coating composition based on a VEA copolymer dispersion

| Function | Ingredient/Product | Proportion [wt. %] |
|---|---|---|
| Polymeric binder | Mowilith LDM1865WP Vinyl acetate-ethylene-acrylate copolymer Solid content: 53.5 wt. % | 29.5 |
| Swellable filler | composite particles | 17.5 |
| Other fillers | OMYACARB 2, Calcium carbonaet | 1 |
| | SOCAl P3, precipitated calcium carbonate | 1.5 |
| Pigment | Kronos 2190, titanium dioxide | 15.0 |
| Silanizing agent | Hydrophobing agent | 1.2 |
| Auxiliary materials | pH regulator | 0.2 |
| | Dispersing agent | 0.2 |
| | Thickener | 1 |
| | Defoamer | 0.3 |
| | Biocide | 0.1 |
| Dispersant | Water | 32.5 |

To prepare a 1000 ml scale coating composition as shown in Table 1, 250 ml of water and 175 g of composite particles are mixed with a dissolver at 750 to 500 rpm while stirring. A further 65 ml of water is then added and stirred for a further 5 minutes.

Then, 2.0 g dispersant and 175 g titanium dioxide are added while stirring with the dissolver at 1500 to 2000 rpm.

Subsequently, 25 g calcium carbonate are added while stirring with the dissolver at 1500 rpm at 2000 rpm, followed by 10.0 g aluminium silicate while stirring with the dissolver at 1500 to 2000 rpm. Next, the mixture is stirred for 10 minutes.

To the mixture, 3.0 g defoamer are added while stirring with the dissolver at 500 to 750 rpm for 10 minutes.

Then, 295 g vinyl acetate/ethylene/acrylic acid binder are added quickly and stirred with the dissolver at 2000 rpm. To the mixture, 10 ml of water and 1.0 g of thickener are added, followed by further stirring with the dissolver at 2000 rpm for 10 minutes.

1.0 g of biocide is added to the mixture and the mixture is stirred with the dissolver at 750 rpm for 5 minutes.

3. Coating of a Substrate 3.1. Surface Preparation

Before the coating system is applied, the substrate is pre-treated by removing faulty coatings mechanically or by pressure water jetting. The substrate must be dry before the first coat is applied.

3.2. Primer Coat

By adding max. 10 wt. % deep primer to the coating composition described under 2, an additional primer layer can be dispensed with in most cases. Primer, intermediate and final coat The coating composition is preferably applied in 2 or 3 coats by priming, possibly intermediate and final painting on a substrate, in particular a building facade. It is preferably applied by brush or roller.

For the primer coat, if no primer coat is applied, a maximum of 10 wt. % deep primer—as already mentioned above—can be added to the coating composition.

The primer or intermediate coat must be diluted with max. 10 wt. % water. On rough surfaces, depending on the structure and absorbency, the intermediate and final coats must be diluted slightly more and struck out well. The degree of dilution is to be determined by means of a test coat.

To level unevenly abraded plaster and to silting up fine cracks in the plaster, an intermediate coat can be applied diluted with max. 5 to 10 wt. % water.

The final coat can be diluted with max. 5 to 10 wt. % water. Particularly in the case of intensive colors, the final coat should be diluted with 10 wt. % water to achieve a strip-free surface.

A drying time of at least 12 hours should be allowed between coats. Approx. 150 to 200 ml/m² of the coating composition is usually sufficient for a coat on a smooth substrate. On rough surfaces the consumption increases accordingly. An exact consumption can be determined by a test coating.

4. Comparison with State-of-the-Art Coatings

A coating containing the composite particles according to the invention and coatings based on commercial silicate paints, plastic dispersion paints and silicone resin paints are tested under identical conditions. The results are shown in Table 2.

TABLE 2

Comparison of a coating functionalized with composite materials according to the invention and commercially available coatings

| Facade paint | $S_d$ value [m][1] | µ-value | W-value [kg/m²*h^0.5]² | Back-drying [3 h]² | Capillary active Drying [24 h]² |
|---|---|---|---|---|---|
| Silicone resin paint | 0.14 | 1500 | 0.08 | 3% | 8% |
| Silicate paint | 0.01 | 50 | 1.0 | 4% | 22% |
| Plastic dispersion paint | 0.70 | 4000 | 0.03 | 5% | 18% |
| Plastic emulsion paint + functionalized fillers (according to the invention) | 0.01 to 0.3 | 150 | 0.05 to 0.2 | 19% | 35% |

[1]according to DIN EN 7783
[2]according to DIN EN 1062

Table 2 shows some important colorant properties of different facade paints, whereby silicone resin paints represent the highest standard to date in the state of the art and offer the best combination of low capillary water absorption with the highest possible water-vapor diffusion rate. The plastic dispersion paint with functionalized fillers according to the invention further improves these values.

In addition, the use of the functionalized fillers enables the facade surface to dry more quickly after exposure to rain: after a 24-hour soaking period (according to DIN EN 1062-3), the re-drying rate was increased from 5% to 19% within the first hour by using the modified fillers, i.e. composite particles according to the invention.

The hydrophilically adjusted facade paint according to the invention leads to a spreading of the surface moisture and formation of an even moisture film which can evaporate faster. This eliminates the basis for microbial infestation in the form of surface moisture. This is further enhanced by the high diffusibility of the facade coating.

In addition, a capillary-active drying effect on damp mineral substrates has been observed, which ensures that capillary-bound water in the substrate is sucked to the surface and can dry faster. This has resulted in improved drying compared to silicone resin paints. By storing the paint in water according to DIN EN 1062-3 for 24 h afterwards, the re-drying was determined gravimetrically. After 24 hours, the sand-lime bricks coated with the functionalized facade paint according to the invention showed a water release of 35% by weight compared to 18% by weight for the silicone resin coatings.

By functionalizing porous fillers with superabsorbent polymers (SAP), the capillary water absorption (W-value) of a diffusible wall paint functionalized according to the invention can be reduced from initially greater than 0.5 kg/m2 h0.5 to values in the range of less than 0.005 kg/m2 h0.5, so that overall W-values in the range of 0.1 to 0.03 kg/m2 h0.5 result and the facade paints functionalized according to the invention are considered water-repellent. The capillary water absorption is determined according to DIN 1062 EN. It becomes apparent, especially at the beginning of the measurement up to 4 hours measuring time, that the facade coating containing the composite particles according to the invention absorbs more water than commercially available coatings based on plastic dispersion paints. The water absorption causes the pores of the coating containing the composite particles according to the invention to close due to swelling of the SAP and the water absorption rate drops significantly.

This is achieved while maintaining a high water-vapor diffusivity in the dry state. The wall paints functionalized according to the invention have an water-vapor diffusion-equivalent air layer thickness ($S_d$ value) equivalent to water-vapor diffusion of between 0.01 and 0.1 m and are therefore considered to be highly permeable.

REFERENCE SIGNS

| | |
|---|---|
| 1 | composite particles |
| 2 | pores |
| 3 | swellable material |
| 4 | liquid water |
| 5 | swollen swellable material |
| 6 | coating system |
| 7 | substrate |
| 8 | coating |
| 9 | primer coat |

The invention claimed is:

1. A composite material comprising composite particles, wherein the composite particles include: (a) a porous carrier material in particulate form, wherein the porous carrier material has pores with pore sizes in the range of 10 nm to 2 μm, and (b) a swellable material, wherein the pores of the porous carrier material contain the swellable material, wherein the porous carrier material is a mineral filler or a mixture of mineral fillers, wherein the porous carrier material has an open pore system, wherein the swellable material is formed in the pores of the porous carrier material to provide an internal coating therein of the swellable material, and wherein the swellable material exhibits a non-swollen volume and during a swelling process, a swollen volume, and wherein the swollen volume increases, relative to the non-swollen volume, by at least a factor of 0.5.

2. The composite material according to claim 1, wherein the composite particles have particle sizes in the range from 5 to 30 μm.

3. The composite material according to claim 1, wherein the mineral filler is selected from the group consisting of silicas, xerogels, diatomaceous earth, zeolites, aerogels, perlite, tuff, expanded clay, vermiculite and layered silicates.

4. The composite material according to claim 1, wherein the mineral filler is selected from the group consisting of fumed silicas, silica gels, diatomaceous earth, bentonite, kaolinite, and mixtures thereof.

5. The composite material according to claim 1, wherein the swellable material exhibits a non-swollen volume and during a swelling process, a swollen volume, and wherein the swollen volume increases, relative to the non-swollen volume, by a factor of 0.5 to 10.

6. The composite material according to claim 1, wherein the swellable material is selected from the group consisting of natural polymers, synthetic polymers, mineral substances and mixtures thereof.

7. The composite material according to claim 6, wherein the swellable material selected is a synthetic polymer.

8. The composite material according to claim 6, wherein the swellable material selected is a natural polymer selected from the group consisting of alginates, alginic acid, amylose, amylopectin, agar, gelatin, callose, carrageenan, cellulose, chitin, chitosan, dextran, guluronic acid, inulin, laminarin, lichenin, pullulan, pustulan, starch, starch derivatives, xanthan and mixtures thereof.

9. The composite material according to claim 7, wherein the swellable material selected is a synthetic polymer selected from the group consisting of (meth)acrylates, poly(meth)acrylic acid, salts of poly(meth)acrylic acid, polyacrylamide, poly alcohols and their co- and terpolymers and mixtures thereof.

10. The composite material according to claim 1, wherein the swellable material is a superabsorbent polymer.

11. A coating composition including the composite material according to claim 1, selected from the group consisting of a facade coating, a corrosion protection coating, an anti-ice coating and a wood protection coating.

12. A process for the production of the composite material according to claim 1, the process comprising the steps of:(a) providing a porous carrier material, and (b) forming a swellable material in the pores of the porous carrier material.

13. The process according to claim 12, wherein process step (a) includes the introduction of the porous carrier material in bulk.

14. The process according to claim 12, wherein process step (a) includes the introduction of the porous carrier material as a dispersion.

15. The process according to claim 12, wherein process step (b) includes the addition of precursors of the swellable material to the porous carrier material in liquid form as a solution.

16. The process according to claim 12, wherein process step (b) includes the addition of precursors of the swellable material to the porous carrier material in liquid form as a dispersion.

* * * * *